United States Patent
LaPanse et al.

(10) Patent No.: US 9,213,646 B1
(45) Date of Patent: Dec. 15, 2015

(54) CACHE DATA VALUE TRACKING

(71) Applicant: Seagate Technology LLC, Cupertino, CA (US)

(72) Inventors: Margot Ann LaPanse, Superior, CO (US); Joseph Masaki Baum, Longmont, CO (US); Stanton MacDonough Keeler, Longmont, CO (US); Michael Edward Baum, Longmont, CO (US); Thomas Dale Hosman, Edmond, CO (US); Robert Dale Murphy, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 135 days.

(21) Appl. No.: 13/922,921

(22) Filed: Jun. 20, 2013

(51) Int. Cl.
*G06F 12/12* (2006.01)
*G06F 12/08* (2006.01)

(52) U.S. Cl.
CPC .................... *G06F 12/0891* (2013.01)

(58) Field of Classification Search
CPC ..... G06F 12/122; G06F 3/0617; G06F 3/067; G06F 12/0891
USPC .......... 711/114, 113, 146, 133, 141, 145, 167
See application file for complete search history.

(56) References Cited

U.S. PATENT DOCUMENTS

| | | | |
|---|---|---|---|
| 6,256,712 B1 * | 7/2001 | Challenger et al. | 711/141 |
| 6,453,319 B1 | 9/2002 | Mattis | |
| 6,742,084 B1 * | 5/2004 | Defouw et al. | 711/133 |
| 7,293,144 B2 | 11/2007 | Matsui | |
| 7,660,945 B1 | 2/2010 | Lee | |
| 7,870,335 B2 * | 1/2011 | Lubbers et al. | 711/114 |
| 8,055,841 B2 | 11/2011 | Breslau | |
| 8,375,166 B2 | 2/2013 | Lee | |
| 8,380,948 B2 | 2/2013 | Panther | |
| 8,381,072 B2 | 2/2013 | Kanai | |
| 8,402,223 B2 | 3/2013 | Birka | |
| 2014/0173046 A1 * | 6/2014 | Crowder et al. | 709/219 |

* cited by examiner

*Primary Examiner* — Pierre-Michel Bataille
(74) *Attorney, Agent, or Firm* — Cesari & Reed LLP; Kirk A. Cesari; Christian W. Best

(57) ABSTRACT

Systems and methods are disclosed for cache data value tracking. In an embodiment, a controller may be configured to select data; set a node weight for the data representing a cache hit potential for the data; store a first time stamp value for the data representing when the data was accessed; and store the data in a cache memory based on the node weight and the first time stamp value. In another embodiment, a method may comprise setting a node weight for data associated with a data access command, storing a first access counter value for the data representing a number of times new data has been stored to the cache memory when the data was accessed, and removing the data from the cache memory or maintaining the data in the cache memory based on the node weight and the first access counter value.

18 Claims, 7 Drawing Sheets

CACHE DATA VALUE TRACKING

BACKGROUND

This disclosure relates to data storage devices (DSDs), and particularly to DSDs employing data caching.

SUMMARY

In an embodiment, an apparatus may comprise a controller configured to select data; set a node weight for the data, the node weight representing a value of a cache hit potential for the data; store a first time stamp value for the data representing when the data was accessed; and store the data in a cache memory based on the node weight and the first time stamp value.

In another embodiment, a method may comprise receiving a data access command at a data storage device including a cache memory; setting a node weight for data associated with the data access command, the node weight representing a value of a cache hit potential for the data; storing a first time stamp value for the data representing when the data was accessed; and removing the data from the cache memory based on the node weight and the first time stamp.

In another embodiment, a computer-readable storage medium may store instructions that cause a processor to perform a method comprising receiving a data access command at a data storage device including a cache memory; setting a node weight for data associated with the data access command, the node weight representing a value of a cache hit potential for the data; storing a first access counter value for the data representing a number of times new data has been stored to the cache memory when the data was accessed; and removing the data from the cache memory or maintaining the data in the cache memory based on the node weight and the first access counter value.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure. It is also to be understood that features of the various embodiments can be combined, exchanged, or removed without departing from the scope of the present disclosure.

Figure 1:
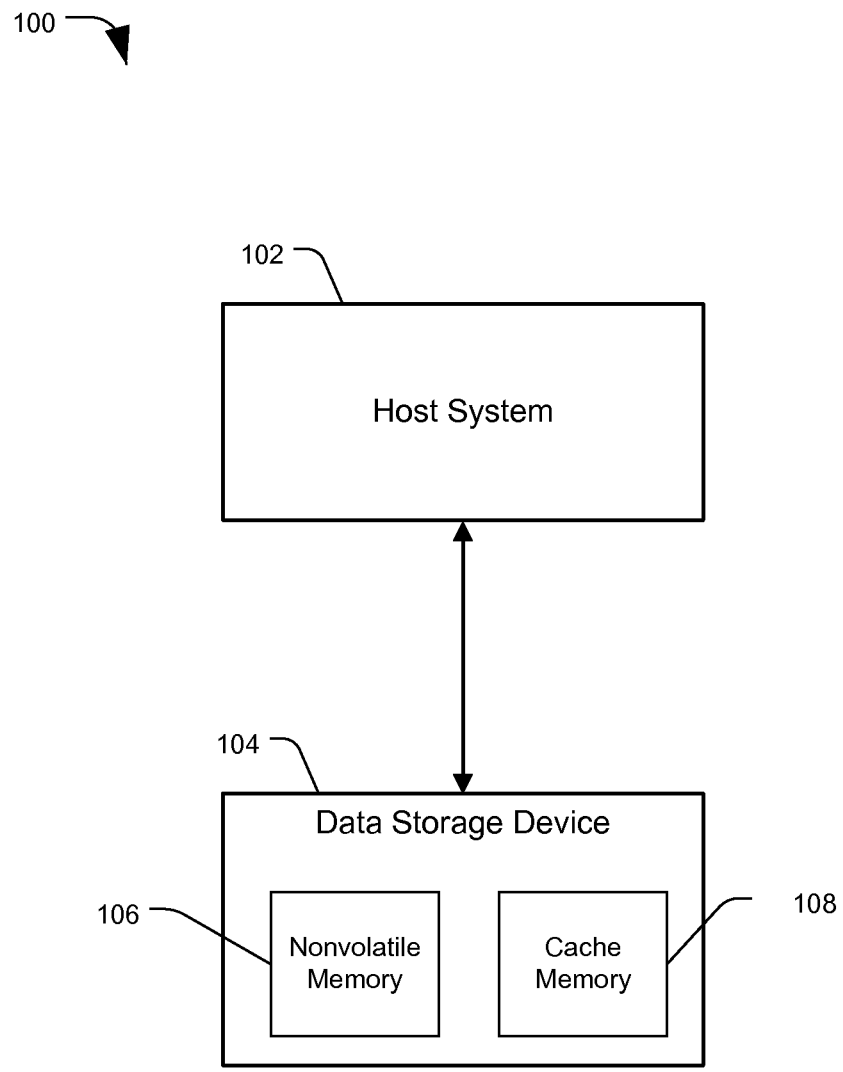
FIG. 1 is a diagram of an illustrative embodiment of a system for cache data value tracking.

FIG. 1 depicts an embodiment of a system for cache data value tracking, generally designated 100. The system 100 may include a host 102 and a data storage device (DSD) 104. The host 102 may also be referred to as the host system or host computer. The host 102 can be a desktop computer, a laptop computer, a server, a tablet computer, a telephone, a music player, another electronic device, or any combination thereof. Similarly, the DSD 104 may be any of the above-listed devices, or any other device which may be used to store or retrieve data. The host 102 and DSD 104 may be connected by way of a wired or wireless connection, or by a local area network (LAN) or wide area network (WAN). In some embodiments, the DSD 104 can be a stand-alone device not connected to a host 102, or the host 102 and DSD 104 may both be part of a single unit.

The DSD 104 may include a nonvolatile memory 106 and cache memory 108. The nonvolatile memory 106 may comprise magnetic storage media such as disc drives, nonvolatile solid state memories, or other types of memory, or a combination thereof. The cache memory 108 may comprise volatile or nonvolatile memory, such as discs, NAND (negative-AND) or other types of flash memory, DRAM (dynamic random access memory), any other type of memory, or a combination thereof. For example, the DSD 104 may comprise a hybrid drive, with a disc nonvolatile memory 106 and a solid state flash cache memory 108.

In some embodiments, the cache memory 108 may have a faster read or write access time than the nonvolatile memory 106. The cache memory 108 may be used to store data for faster access than the access speeds to the nonvolatile memory 106. For example, the DSD 104 may receive a data read request from the host 102, and the DSD may check the cache memory 108 first to determine whether it holds the requested data. If it does, the DSD 104 may be able to retrieve the data quickly, while if it does not the DSD may need to retrieve the data from a slower nonvolatile memory 106, and may load the data into the cache 108 in case of future read requests. In another example, the DSD 104 may receive a data write command. The DSD 104 may write the data to the cache memory 108, which may be faster than writing to the nonvolatile memory 106. In this manner, if the data is being frequently updated, it is only written to the faster cache 108, and may only be copied to the nonvolatile memory at intervals or at a later time.

The cache 108 may have a smaller data capacity than the nonvolatile memory 106, and therefore it may be advantageous to maintain data in the cache that is frequently read. Accordingly, algorithms and methods for tracking the value of data in the cache may be used to determine which data to keep in the cache 106 and which data to discard in order to free up additional cache space. By computing a high resolution weighting factor, one can track the value of pieces of data within the cache 108, and then optimize background cleaning and defragmentation algorithms such that they discard low-value data, while retaining data that is high value. An algorithm can be used to compute the value (sometimes called the weight) of a given piece of cached data, based on both how frequently and how recently that particular piece of data has been requested (e.g. read) by the host system 102, and then makes use of that weighting factor when deciding which data to discard from the cache 108.

Figure 2:
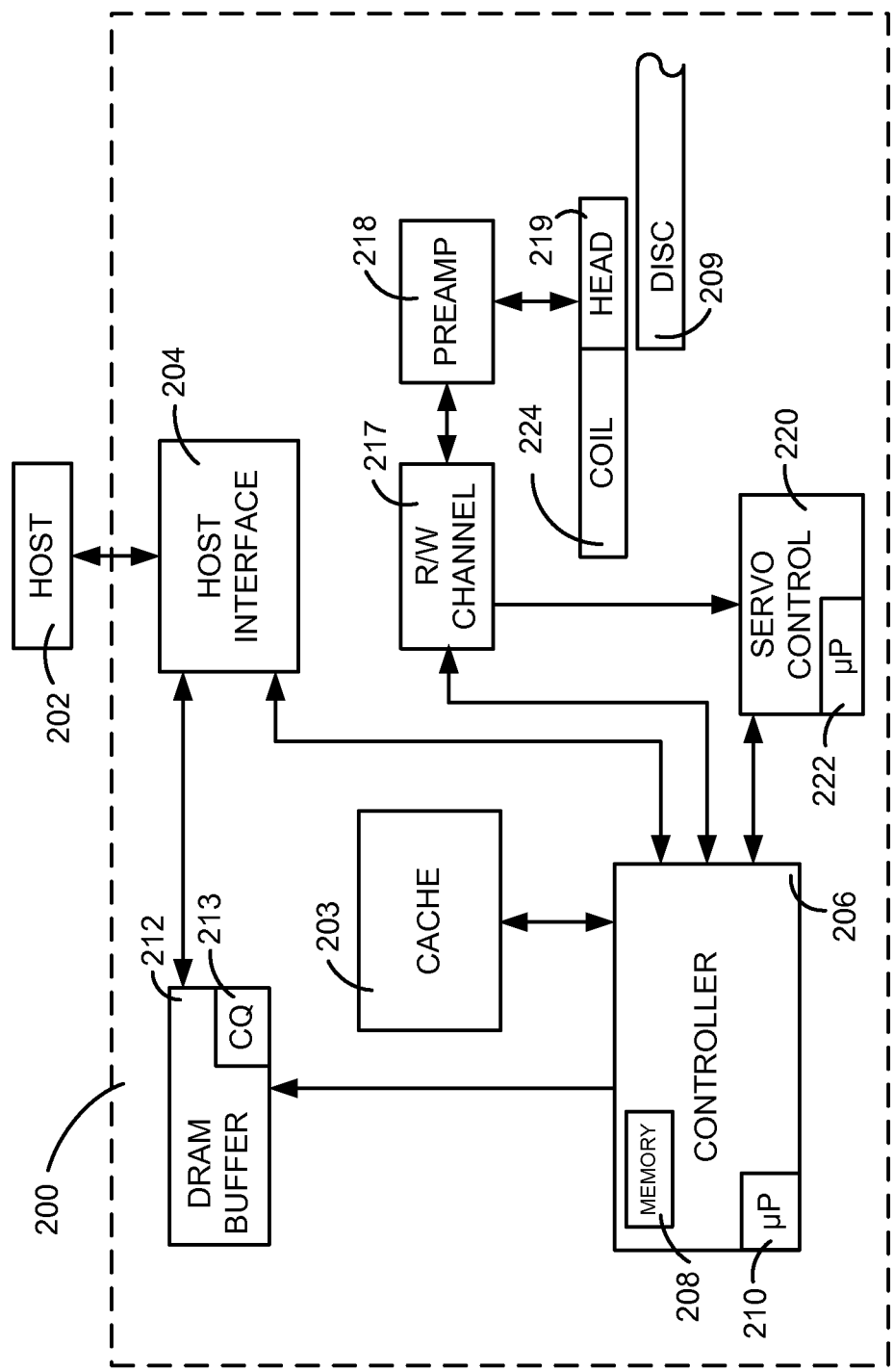
FIG. 2 is a diagram of an another illustrative embodiment of a system for cache data value tracking.

FIG. 2 depicts a diagram of an embodiment of a system for cache data value tracking, generally designated 200. Specifically, FIG. 2 provides a functional block diagram of an example disc drive data storage device (DSD) 200. The DSD 200 may be a data storage device such as the device 104 shown in FIG. 1. The data storage device 200 can communicate with a host device 202 (such as the host system 102 shown in FIG. 1) via a hardware or firmware-based interface circuit 204 that may include a connector (not shown) that allows the DSD 200 to be physically removed from the host 202. In some embodiments, the DSD 200 may communicate with the host 202 through the interface 204 over wired or wireless communication. The buffer 212 can temporarily store data during read and write operations, and can include a command queue (CQ) 213 where multiple pending operations can be temporarily stored pending execution. A cache memory 203 can be included, such as a nonvolatile solid state memory like NAND Flash memory, to store recently or frequently read or written data. A DSD 200 containing multiple types of nonvolatile storage mediums, such as a disc 209 and Flash 203, may be a hybrid storage device.

The DSD 200 can include a programmable controller 206 with associated memory 208 and processor 210. Further, FIG. 2 shows the DSD 200 can include a read-write (R/W) channel 217, which can encode data during write operations and reconstruct user data retrieved from disc(s) 209 during read operations. A preamplifier circuit (preamp) 218 can apply write currents to the head(s) 219 and provides pre-amplification of read-back signals. A servo control circuit 220 may use servo data to provide the appropriate current to the coil 224 to position the head(s) 219. The controller 206 can communicate with a processor 222 to move the head(s) 219 to the desired locations on the disc(s) 209 during execution of various pending commands in the command queue 213. In some embodiments, the cache 203 may store copies of data already stored on the disc 209, such as data read from the disc and loaded into the cache. At other times, the cache 203 may contain data not on the disc 209, such as write data that has not yet been recorded to the disc 209.

In an example embodiment, a command is received at the DSD 200 from the host 202 over the interface 204. The interface 204 may comprise any interface that allows communication between a host 202 and a DSD 200, either wired or wireless, such as USB (universal serial bus), IEEE (Institute of Electrical and Electronics Engineers) 1394, Compact Flash, SATA (serial advanced technology attachment), eSATA (external SATA), PATA (parallel advanced technology attachment), SCSI (small computer system interface), SAS (serial attached SCSI), PCIe (peripheral component interconnect express), Fibre Channel, Ethernet, or Thunderbolt, among others. The DSD 200 may be configured to determine the nature of the command and behave accordingly. For example, a read command may result in the DSD 200 checking the cache 203 for the data, and either retrieving the data from the cache or spinning up the disc 209 if the data was not in the cache. In another example, a write command may result in the DSD 200 writing the data to the cache 203, invalidating any old copies of the same data still existing in the cache, and transferring the write data to the disc 209 at a later point in time. Invalidating data may include making the data inaccessible, such as removing references to the data in a mapping table or marking the data as old or invalid in a table.

Figure 3:
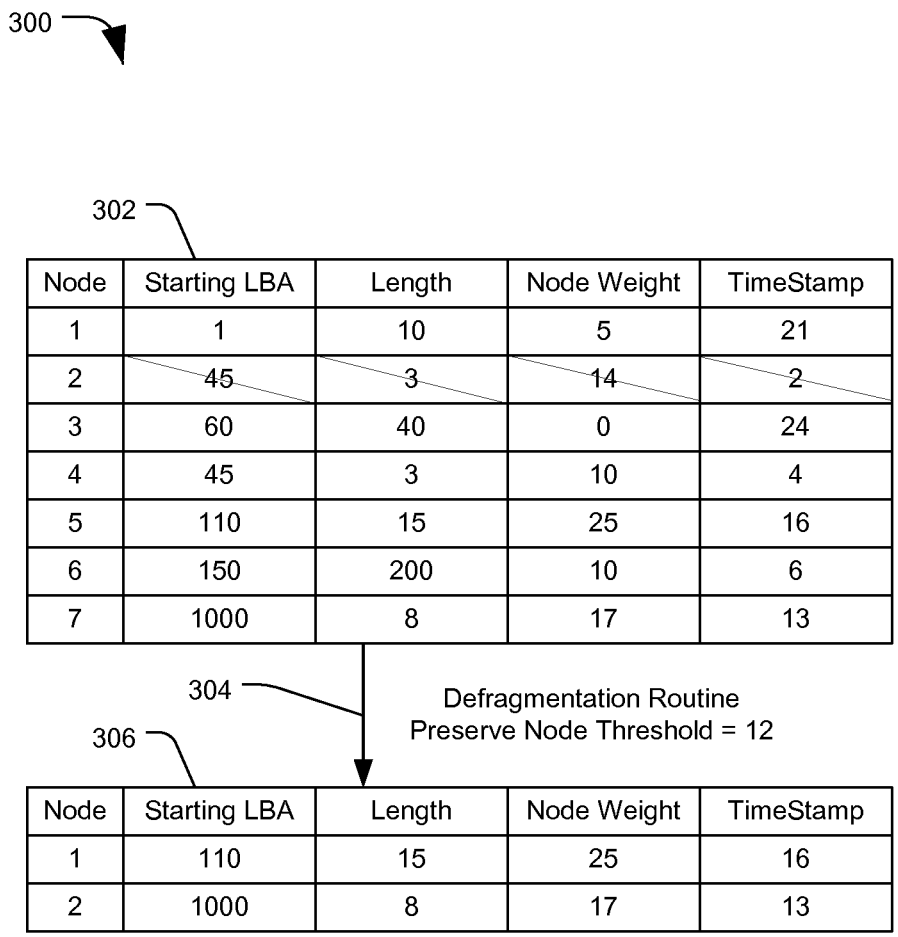
FIG. 3 is a diagram of an illustrative embodiment of cache data value tracking.

Turning to FIG. 3, a diagram of an illustrative embodiment of cache data value tracking is depicted and generally designated 300. Pieces of data stored in a cache may be referred to as "nodes," with certain information tracked for each node. These nodes may be used to describe ranges of Logical Block Addresses (LBAs) that are placed in the cache. An LBA may correspond to a single data storage sector, with each sector having a set data capacity. Accordingly, larger pieces of data may require more sectors to store, and therefore have more corresponding LBAs. For example, a node may include a series of consecutive LBAs, such as LBAs 1-25.

Each time a new node is added to cache memory, for example from a write command received from a host or data read into the cache from nonvolatile memory, a node entry may be tracked by a data storage device. Example chart 302 depicts a set of seven nodes numbered 1 through 7. In some embodiments, the chart 302 may correspond to an address mapping table maintained by a data storage device to look up the location of data. Each node may include a starting LBA, a length (the total number of LBAs in the node), a node weight, and a TimeStamp (sometimes called a time stamp). Chart 302 also depicts a node number for each node. In some embodiments, additional or less information may be tracked for each node.

Some storage media used for cache memory may have different granularities for write and erase operations. For example, NAND flash memory can be written on a sector-by-sector basis, but occupied sectors may not be overwritten and may only be erased in large blocks, which may contain many sectors. This may result in a cache storing nodes which contain only invalid out-of-date data, such as when new, incoming host data overlaps the range of an existing node. For example node 2 in chart 302 may contain starting LBA 45 with a 3-LBA length. Node 4 may also contain starting LBA 45 with a 3-LBA length, but must be written to new cache sectors rather than overwriting existing node 2. This may result in the cache sectors containing node 2 being marked as containing invalid data. As nodes are invalidated (e.g. due to new host writes), cache blocks may become more and more fragmented, and can eventually end up having very little valid data given the space consumed. In this scenario it may be desirable to take the valid data and move it to a new cache block so that the original flash block can be erased. This process is known as defragmentation, and may also be referred to as cache flushing. It may be even more desirable to only copy valuable valid data, rather than moving data that is unlikely to be read frequently.

In some cases, certain LBA ranges are not frequently updated with new host data. Although those nodes may still have valid data, that data may or may not be read frequently or at all by the host. For example, some data may get written once, and then not written or read again for a long time. Other data may be written once, but may be read frequently thereafter. The former case may be an example of low-value data from a caching perspective, while the latter case may be high-value data.

In order to gauge the value of a node, two other parameters, node weight (or just weight) and TimeStamp, may be tracked for each node stored in the cache. Node weight may generally be considered a node's value metric for a given point in time, and may range from 0 to a set Max Node Value. For example, the node weight may represent a node's cache hit potential, which may be a likelihood that the node will be requested during a data request. When a node is first written, the weight may be set to an initial value, and the current TimeStamp may be recorded. Each node may be initialized with a set weight value, e.g. 10. TimeStamp may be an actual representation of chronological time at which the data is recorded, or it may be an approximation used to track a frequency of accesses. For example, the TimeStamp may be proportional to the number of writes or other operations that have been sent to the cache memory. In some embodiments, the TimeStamp value for a cache may be incremented every 100,000 clock pulses. In an embodiment, a TimeStamp value for a cache may be initialized to 0 when a data storage device is powered on for the first time. Every time a new piece of data is loaded into the cache, from either a host write command or data copied from nonvolatile memory to the cache, the TimeStamp counter may be incremented by a value, such as 1. In some embodiments, a number of operations sent to the cache may be tracked, and the TimeStamp used for nodes may be a multiple or a fraction of that tracked number of operations.

Node aging and value may be tracked by updating the node weight and TimeStamp for each node. Current node value may be calculated at any time based on the recorded node weight and TimeStamp and the current TimeStamp value. That is, the current node value may depend on period since the last time the node was accessed. In an example embodiment, current or actual node weight (i.e. value) may be computed as: Actual Weight=[Weight−(Current TimeStamp−TimeStamp in Table)*Decrement Value]. The longer it has been since the node was last accessed, the more the weight of that node may decrease. Decrement value may be any value, or may be omitted. For example, setting the decrement value to less than one may slow the value deterioration of a node, or "aging," while setting it to greater than one may accelerate the aging.

Using the example algorithm above, assume that node 4 of chart 302 was initialized with a weight of 10 and has not been accessed since that time. Computing the actual weight of node 4 with a current TimeStamp value of 8 and a decrement value of 1 would be: Actual Weight=[10−(8−4)*1]=6. This means that at TimeStamp 8, the weight of node 4 has fallen from the initial weight of 10 to the current weight of 4.

Every time a node is read (e.g. cache hit), the Actual Node Weight may be calculated, incremented by a value, and stored as the new node weight. Additionally, the TimeStamp may be updated to the current TimeStamp. For example, every time a node is read, it may be appropriately aged (such as node 4, above), and it may be incremented by some constant value, such as 5. Nodes which are frequently read may therefore have their weight increased, while nodes that are infrequently read may lose value over time.

In the example embodiment of FIG. 3, a node's weight may not be calculated and incremented when the node is rewritten. For example, node 2 may have increased to a node weight of 14. The node may have then been rewritten in node 4, and given a default new node weight of 10. In some embodiments, the Actual Node Weight may be calculated and updated when a node is rewritten. For example, when a write command is received, a data storage device may detect whether the data of the write command corresponds to a node already contained in the cache. If it does, the node weight may be copied to the new node, and the old node may be invalidated. In some embodiments, the new node may have its value decremented from aging or incremented as well.

Defragmentation routines may be invoked for the cache memory periodically, e.g. when a threshold number of cache sectors or nodes in a block are invalid, after a set period of time, when the DSD is idle, when additional cache space is required, other triggers, or any combination thereof. During defragmentation routines, the Actual Node Weight for each node may be calculated to decide whether or not the node is valuable enough to retain in the cache, such as by copying the node to a new flash block. For example, nodes with an actual weight less than a Preserve Node Threshold may not be copied or preserved. Nodes with an actual node weight greater than or equal to the Preserve Node Threshold may be copied to a new flash block, and their node weight and TimeStamp may be updated. In some implementations the node weight and TimeStamp may not be updated, as updating at the time of a defragmentation routine may not provide a performance benefit.

As depicted in diagram 300, a defragmentation routine may be performed, represented by arrow 304. It may be assumed in this example that chart 302 depicts the actual node weight for each node calculated during the defragmentation routine. If the Preserve Node Threshold is set to 12, only nodes 5 and 7 of chart 302 have a weight that exceeds the threshold. These two nodes may be preserved and become nodes 1 and 2 of the defragmented cache of chart 306. The nodes with weights below the Preserve Node Threshold may be written to a main nonvolatile memory, and the copy in the cache may be erased or overwritten. In some embodiments, data may not be written to a main memory, such as when the data was copied to the cache in response to a read operation and was never updated. In some embodiments, the Preserve Node Threshold may be set as lower than the node weight assigned to new nodes, so that recently cached data is not cleared from the cache before it has a chance to be read.

On an example embodiment 300, chart 302 may display the nodes contained in a flash memory block of a NAND flash cache memory. Nodes 5 and 7 may be copied to an erased block of chart 306. Nodes not copied to the new cache block may be stored to a disc memory, and old block 302 may then be erased. Using the described embodiment, the amount of data stored in cache may be greatly reduced by the defragmentation routine even though only a small amount of cache sectors were occupied by invalid data in chart 302.

In some embodiments, a data storage device may also track weight or value statistics for each block of cache memory. Some examples may include a Max Actual Node Weight corresponding to the highest node weight of all nodes in the block of memory, or a mean, median, or mode node weight of all nodes in the block. For example, the DSD may find the node in the block with the highest actual weight and associate that weight with the block itself as the Max Actual Node Weight. When a defragmentation routine is initialized, a node weight statistic for the block may be compared against a block threshold. If the block's node weight statistic is below the threshold, the DSD may not defrag any of the nodes of the block at all, and may mark them all as eligible for discarding. If the block's node weight statistic is above the threshold, the DSD may compute the actual node weight for each node as usual and compare them against the Preserve Node Threshold to determine which nodes to retain and which to erase. In some embodiments, the block threshold may be the same as the Preserve Node Threshold. In other embodiments, the block threshold may be higher or lower than the Preserve Node Threshold. In some embodiments, devices may look at multiple node weight statistics, and may compare them to multiple thresholds. For example, a block may only be marked for complete erasure if the Max Actual Node weight statistic is below a first threshold, and a Mean Node Weight statistic of the average node weight for the block is below a second threshold. Having node value statistics for a block may eliminate the need to calculate a node weight for each node during a defragmentation routine.

In some embodiments, in order to have a max node weight or other block value statistic age over time like the individual nodes do, the DSD may also store the appropriate TimeStamp along with the block node weight statistics. This way the node weight statistics can decrease over time to maintain an accurate representation of the nodes contained in the block.

In an example embodiment, whenever a node is accessed in a cache block, the current max actual node weight of the block itself can be calculated and updated based on the current TimeStamp to represent node aging. If the accessed node has had its weight incremented, for example due to a read operation, the new actual node weight of the node can be compared against the max actual node weight of the block. If the node's weight exceeds the block's max node weight, the higher node weight can replace the block's max actual node weight. In some embodiments, if a new node is written to the block, the default new node weight can be compared against the block's max actual node weight as well, in case the max actual node weight has fallen below the new node weight.

Figure 4:
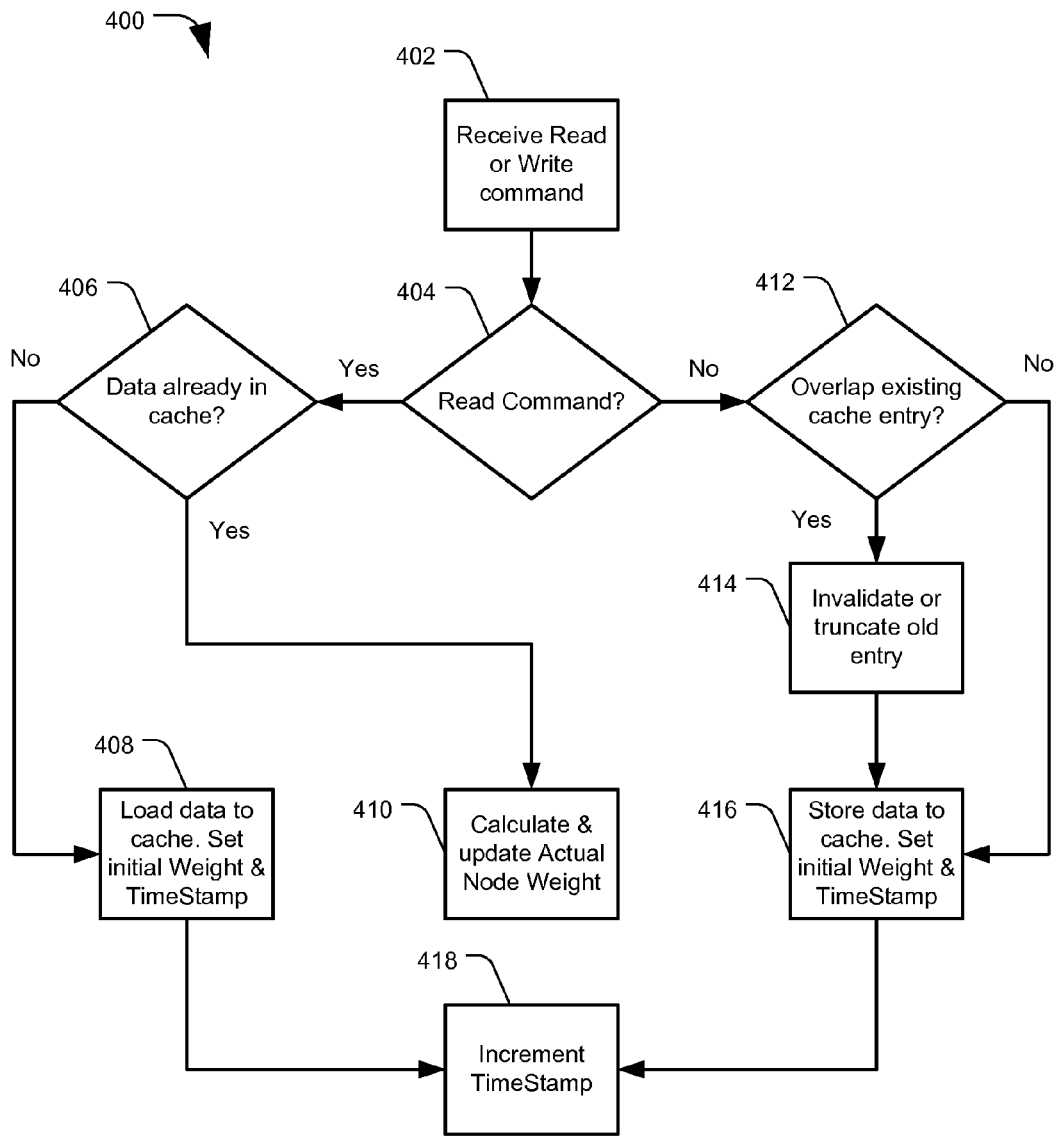
FIG. 4 is a flowchart of an illustrative embodiment of a method for cache data value tracking.

FIG. 4 depicts a flowchart of an illustrative embodiment of a method for cache data value tracking, generally designated 400. Specifically, the method 400 may comprise a method for updating weight values of nodes in response to read or write commands. The method 400 may comprise receiving a read or write command at 402. For example, a data storage device (DSD) may receive a read or write command from a host device. A determination may be made as to whether the command is a read command, at 404.

If the command is a read command, the method 400 may involve determining if the data associated with the read command is already in the cache, at 406. For example, the read command may include a request to read data from a provided range of LBAs, and the cache may be searched for a node containing the provided LBAs. If the requested data is not already in the cache, at 406, the method 400 may involve loading the requested data to the cache, and setting the initial weight and TimeStamp for the new node, at 408. For example, a DSD may read the data from a main nonvolatile memory such as a disc and store a copy to the cache memory as a new node. In some embodiments, the method may then involve incrementing the TimeStamp, at 418. For example, in a DSD where the TimeStamp is a representation of the number of times a new node has been added to the cache, copying data from a main nonvolatile memory to the cache may involve incrementing the TimeStamp.

If the data associated with the read command is already in the cache, at 406, the method 400 may involve calculating and updating the actual node weight for the requested node, at 410. For example, this may involve aging the node weight based on a difference between the current TimeStamp and the TimeStamp recorded for the node. Updating the actual node weight may also involve adding an increment value to the weight. In addition, the TimeStamp for the accessed node may be updated to the current TimeStamp.

When the command is not a read command, at 404, the method 400 may involve determining whether the write command overlaps an existing cache entry, at 412. For example, the write command may include data and a range of LBAs to which the data corresponds. The cache may be searched to determine if an existing node contains the range of LBAs from the write command.

If the write command does overlap an existing cache entry, the method 400 may involve invalidating or truncating the existing node, at 414, depending on whether the write command completely replaces the existing entry or only partially updates the entry.

If the write command does not overlap an existing cache entry, at 412, or after invalidating or truncating the existing cache entry, at 414, the method 400 may involve storing the data from the write command to the cache as a new node, at 416. This may also involve setting an initial node weight value and the current TimeStamp value for the node. Rather than using a standard initial weight value for data that overlapped an existing node entry, at 412, storing the write command data to the cache at 416 may involve copying or updating the weight value of the old overlapped node. This may preserve the weight of a frequently read node that has been updated by the write command. The method 400 may next involve incrementing the TimeStamp for the cache, at 418, for example in embodiments where the TimeStamp represents a number of times new nodes have been added to the cache.

Figure 5:
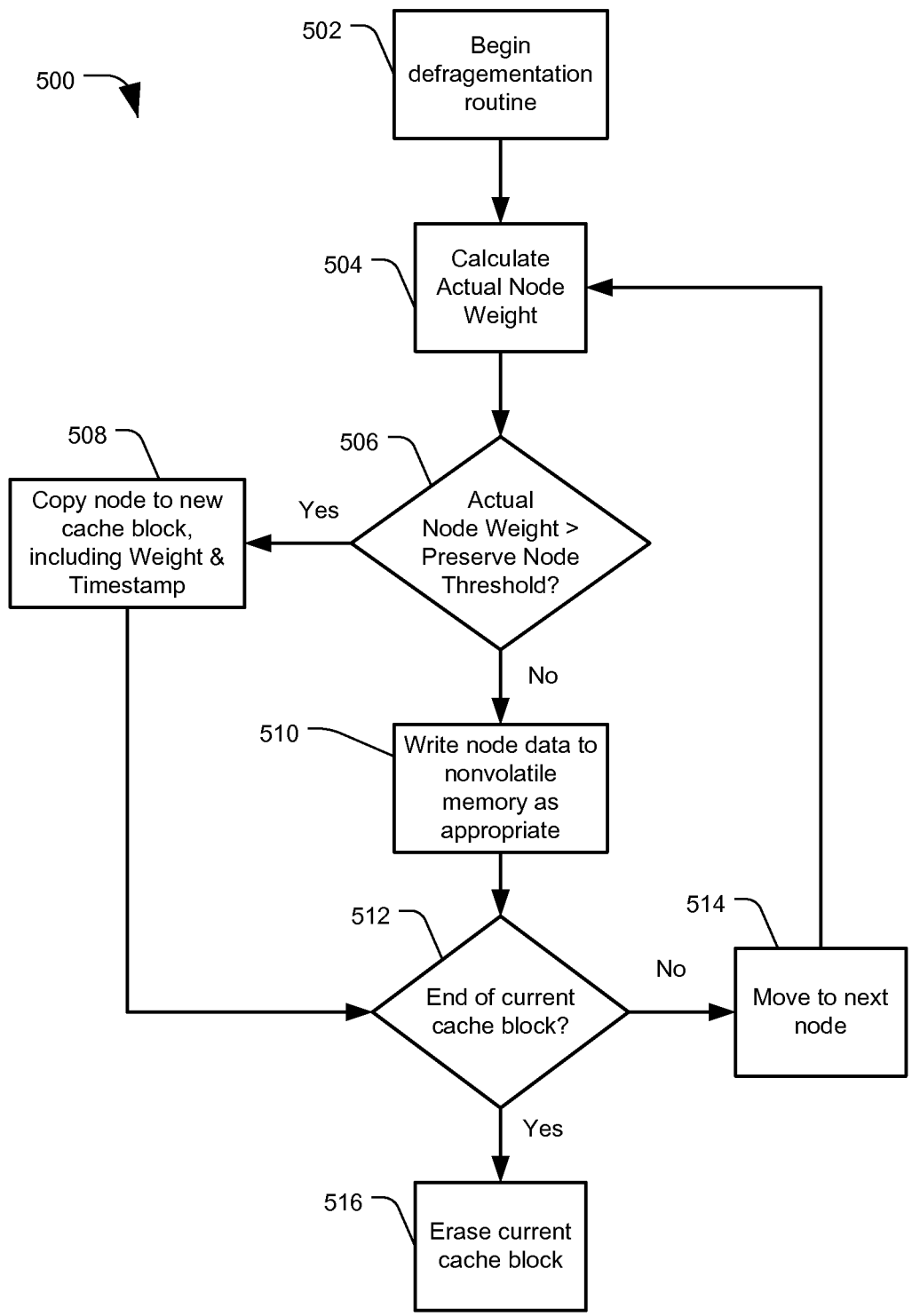
FIG. 5 is another flowchart of an illustrative embodiment of a method for cache data value tracking.

FIG. 5 depicts another flowchart of an illustrative embodiment of a method for cache data value tracking, generally designated 500. Specifically, method 500 shows an example embodiment of executing a defragmentation routine on a cache employing data value tracking. The method 500 may involve beginning a defragmentation routine at 502. For example, the defragmentation may begin in response to a user instruction, based on an amount of invalid sectors or nodes, based on a need for additional cache space, based on a set time interval, based on a number of new nodes stored to the cache since the last defragmentation operation, in response to a device entering an idle state, another trigger, or any combination thereof.

The method 500 may next involve calculating an actual node weight for a node in a cache block, at 504. For example, this may involve computing a difference in a current TimeStamp value from the node's TimeStamp value, and subtracting that difference from the nodes weight value. A determination of whether the actual node weight is greater than a preserve node threshold may be made at 506.

If the actual node weight is greater than the preserve node threshold, the method 500 may involve copying the node to a new cache block, including the weight and TimeStamp of the node. In some embodiments, the copied node may be given the actual node weight calculated during the defragmentation routine, and the current TimeStamp. In other embodiments, the existing node weight and TimeStamp may be copied from the last time the node was updated.

If the actual node weight is not greater than the preserve node threshold, at 506, the method 500 may involve writing the data corresponding to the node to a nonvolatile memory if the data is newer than any version stored in the nonvolatile memory, at 510. This can prevent the most recent version of the cached data from being lost if the node is deleted from the cache. If the data corresponding to the node in the cache is not newer than a version in the nonvolatile memory, there may be no need to write the data to the nonvolatile memory at 510.

After copying the node to a new cache block at 508, or copying the node data to a nonvolatile memory at 510, the method 500 may involve determining if the defragmentation routine has reached the end of the current cache block, at 512. For example, the defragmentation routine may compare each node of the cache block against the preserve node threshold, starting at the beginning and continuing until reaching the end of the cache block. In other embodiments, the defragmentation routine may check each node for a block by proceeding through a mapping table, and the order in which the nodes are listed may not correspond to the physical placement of the nodes within the cache block.

If the end of the nodes in the cache block has not been reached, at 512, the defragmentation routine may proceed to the next node, at 514, and then calculate the actual node weight for that node, at 504. If the end of the nodes in the cache block has been reached, at 512, the method may involve erasing the current cache block at 516, including all of the nodes that were not copied to a new cache block.

Figure 6:
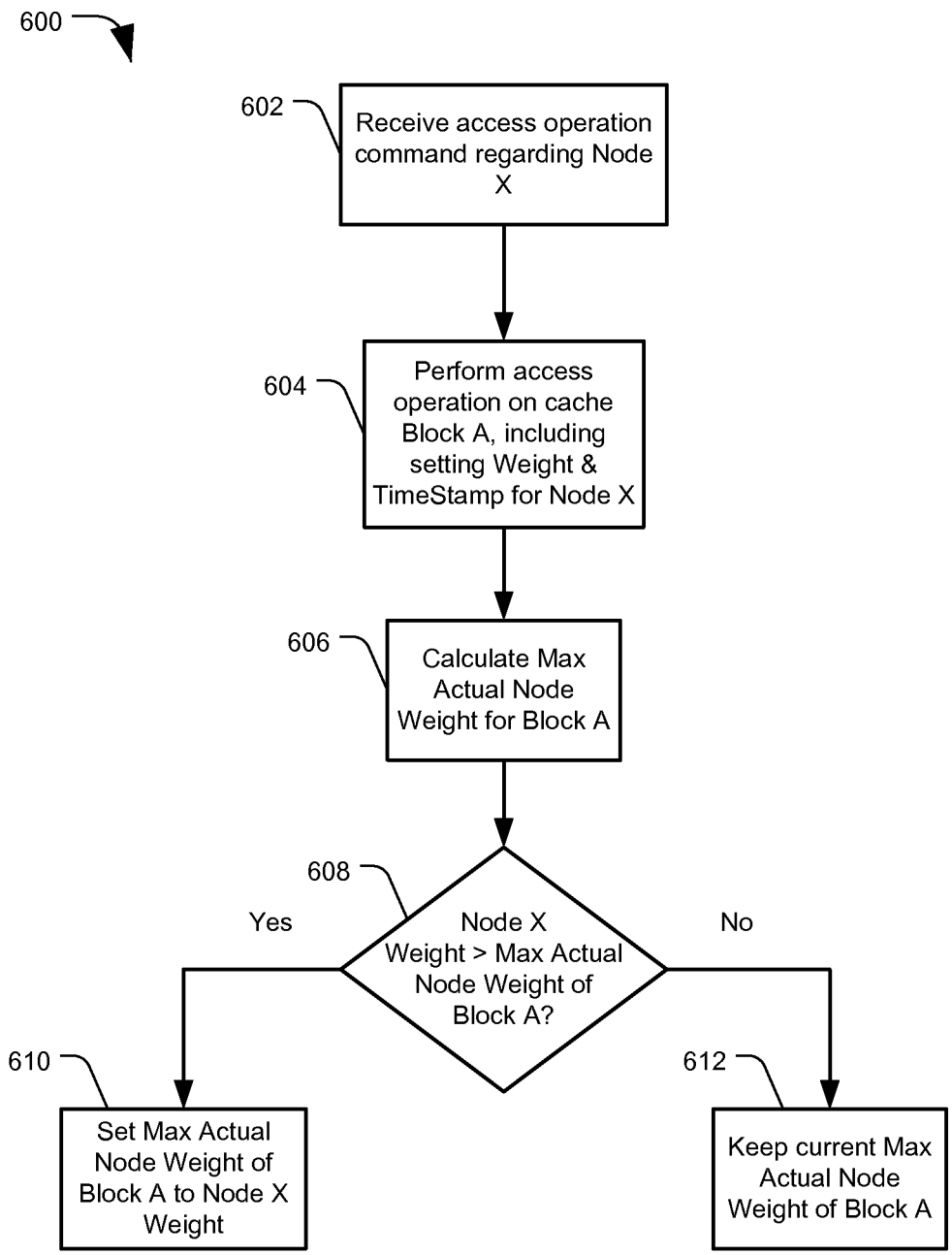
FIG. 6 is another flowchart of an illustrative embodiment of a method for cache data value tracking.

FIG. 6 depicts another flowchart of an illustrative embodiment of a method for cache data value tracking, generally designated 600. Specifically, method 600 may depict a process in which a max actual node weight is maintained for a cache block. The method 600 may involve receiving an access operation command regarding a given Node X, at 602. Next, the method 600 may involve performing the access operation on cache Block A, including setting a weight and TimeStamp for Node X, at 604. For example, this may involve writing new data to a new Node X in Block A, or reading data from an existing Node X. Setting the weight may involve setting a default weight for a new node, or calculating and updating the weight of an existing node.

The method 600 may next involve calculating the Max Actual Node Weight for Block A, at 606. As discussed previously, this may involve updating the weight based on the difference between the current TimeStamp and the TimeStamp recorded for the current Max Actual Node Weight. Because the Max Actual Node Weight may correspond to the weight of an existing node in Block A, the Max Actual Node Weight can accordingly age at the same rate nodes age.

At 608, the method 600 may determine whether the weight of Node X set at 604 is greater than the Max Actual Node Weight calculated at 606. If it is, the Max Actual Node Weight of Block A can be set to the weight of Node X, at 610, and the TimeStamp recorded for the current Max Actual Node Weight may be updated to the current TimeStamp. If the Node X weight is not greater than the Max Actual Node Weight, at 608, the Max Actual Node Weight calculated at 606 can be retained for Block A, at 612.

For Example, the Max Actual Node Weight of Block A may currently be set to the node weight of node 1. When a read command is received for node 1, the Max Actual Node Weight can be aged based on the TimeStamp values. Meanwhile, node 1 can be also be aged, but then it may be increased due to receiving a read operation. Node 1 now has a higher weight than the Max Actual Weight of Block A, and so Block A's Max Actual Weight will be reset to once again match node 1.

Figure 7:
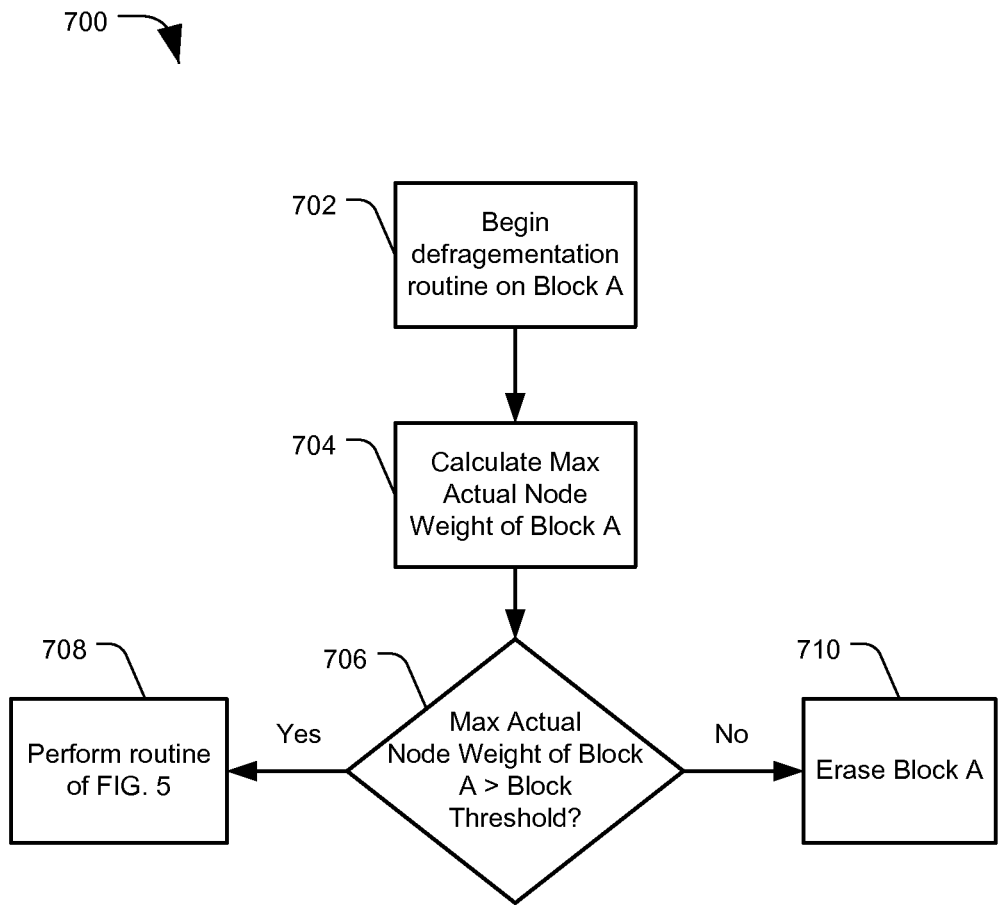
FIG. 7 is a flowchart of an illustrative embodiment of a method for cache data value tracking.

FIG. 7 depicts a flowchart of another illustrative embodiment of a method for cache data value tracking. In particular, method 700 depicts an example embodiment of a process for defragmenting a cache using a Max Actual Node Weight for a cache block. The method 700 may involve beginning a defragmentation routine on Block A of a cache memory, at 702. Next, the method 700 may involve calculating the Max Actual Node Weight of Block A, at 704. This may involve finding a difference between a current TimeStamp and a TimeStamp associated with the existing Max Actual Node Weight, then subtracting that difference from the existing Max Actual Node Weight.

The method 700 may next involve determining if the Max Actual Node Weight calculated at 704 is greater than a Block Threshold, at 706. The Block Threshold may be the same as the Preserve Node Threshold used to determine whether to keep any given node, or it may be higher or lower than the Preserve Node Threshold. If the calculated Max Actual Node Weight is greater than the Block Threshold, the defragmentation routine may involve performing the defragmentation routine of FIG. 5, at 708. If the Max Actual Node Weight of Block A is not greater than the Block Threshold, the method 700 may involve erasing all nodes in Block A, at 710. This may involve saving all valid data in Block A to a main nonvolatile memory, such as a disc memory, prior to erasure.

By determining and discarding low value nodes, cache space may be freed up more quickly, and copying low-value data can be avoided. For example, with a flash cache memory, write and erase cycles can put wear on the memory, diminishing its lifespan. By not copying low-value data to new cache blocks, the amount of wear placed on flash memory can be reduced and the reliability of the memory can be increased. The disclosed embodiments can also improve the performance of cache memories by maintaining the most frequently accessed data.

In some embodiments, a data storage device may contain a non-cache nonvolatile solid-state memory (e.g. Flash) used as addressable storage or to pin frequently accessed data, or a portion of a memory could be used as a cache and another portion could be used to as non-cache storage. Nodes with high node weights could be pinned to a nonvolatile memory so that they can be quickly accessed even if they are removed from the cache memory. For example, there may be a pinning threshold, which may be higher than the preserve node threshold, used to identify highly-valuable nodes for pinning.

In accordance with various embodiments, the methods described herein may be implemented as one or more software programs running on a computer processor or controller device. In accordance with another embodiment, the methods described herein may be implemented as one or more software programs running on a computing device, such as a personal computer that is using a data storage device such as a disc drive. Dedicated hardware implementations including, but not limited to, application specific integrated circuits, programmable logic arrays, and other hardware devices can likewise be constructed to implement the methods described herein. Further, the methods described herein may be implemented as a computer readable storage medium or device storing instructions that when executed cause a processor to perform the methods.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A method comprising:
   receiving a first data access command at a data storage device including a cache memory, the first data access command associated with first data already contained in the cache memory;
   selecting the first data as selected data;
   storing a first time stamp value for the selected data representing when the selected data was accessed;
   setting a node weight representing a value of a cache hit potential for the selected data, setting the node weight for the first data including:
      adjusting an existing node weight based on a difference between a second time stamp corresponding to a current data access operation and the first time stamp which represents a previous time the first data was accessed;
      incrementing the node weight based on the first data access command; and
   removing the selected data from the cache memory based on the node weight and the first time stamp.

2. The method of claim 1, further comprising:
   receiving a second data access command associated with second data not already contained in the cache memory;

selecting the second data as the selected data;
setting the node weight for the second data, including setting the node weight to a default value; and
incrementing a third time stamp representing a number of times new data has been added to the cache memory.

3. The method of claim 1, further comprising:
performing a defragmentation routine on the cache memory including:
calculating a current node weight for each data node in a block of the cache memory based on a difference between a second time stamp, corresponding to when the flush process is performed, and the first time stamp for each node, which represents a previous time each node was accessed,
a data node including a range of logical block addresses (LBAs), the block including a plurality of data storage sectors; and
determining whether to maintain each data node in the cache memory based on the corresponding current node weight.

4. The method of claim 1, further comprising:
after setting the node weight, comparing the node weight against a current maximum node weight representing a highest node weight for data stored in a designated area of the cache memory; and
when the node weight is greater than the current maximum node weight, setting the current maximum node weight to equal the node weight.

5. An apparatus comprising:
a controller configured to:
receive a first data access command at a data storage device including a cache memory, the data access command corresponding to first data not already contained in the cache memory;
select the first data as selected data;
set a node weight for the first data to a default value, the node weight representing a value of a cache hit potential for the selected data;
store a first time stamp value for the selected data representing when the selected data was accessed; and
store the selected data in a cache memory based on the node weight and the first time stamp value.

6. The apparatus of claim 5, further comprising:
the controller further configured to:
receive a second data access command corresponding to second data already contained in the cache memory;
select the second data as the selected data; and
set the node weight for the second data, including adjusting an existing node weight based on a difference between a second time stamp corresponding to a current data access operation and the first time stamp which represents a previous time the second data was accessed.

7. The apparatus of claim 6, further comprising:
setting the node weight further includes incrementing the node weight based on the second data access command.

8. The apparatus of claim 5, comprising the controller further configured to:
increment the time stamp, the time stamp value representing a number of times new data has been added to the cache memory.

9. The apparatus of claim 5, comprising the controller further configured to:
flush cached data from the cache memory, the flush process including:
calculate a current node weight for each data node in a block of the cache memory based on a difference between a second time stamp, corresponding to when the flush process is performed, and the first time stamp for each node, which represents a previous time each node was accessed, a data node including a range of logical block addresses (LBAs), the block including a plurality of data storage sectors; and
determine whether to invalidate each data node based on the corresponding current node weight, invalidating a node comprising making data of the node inaccessible.

10. The apparatus of claim 9, further comprising:
calculating the current node weight includes:
subtracting the first time stamp from the second time stamp to obtain a time difference value; and
subtracting the time difference value from the stored time stamp value to obtain the current node weight.

11. The apparatus of claim 9, further comprising:
determining whether to invalidate each data node includes:
comparing the current node weight for each data node against a first threshold to determine when to preserve a node in the cache memory;
when the current node weight is less than the first threshold, set the corresponding data node for invalidation; and
when the current node weight is greater than the first threshold, copy the corresponding data node to a new block of the cache memory.

12. The apparatus of claim 5, comprising the controller further configured to:
after setting the node weight, compare the node weight against a current maximum node weight, the current maximum node weight representing a highest node weight of data stored in a block of the cache memory where the data is stored;
when the node weight is greater than the current maximum node weight:
set the current maximum node weight to equal the node weight; and
set a maximum node weight time stamp associated with the current maximum node weight to a current time stamp.

13. The apparatus of claim 12, comprising the controller further configured to:
prior to comparing the node weight against the current maximum node weight:
calculate the current maximum node weight based on a previous maximum node weight reduced by a difference between the first time stamp value and a maximum node weight time stamp corresponding to a previous time the maximum node weight was updated.

14. The apparatus of claim 12, comprising the controller further configured to:
perform a defragmentation routine including:
comparing the current maximum node weight against a block threshold to determine whether to keep any data in the block of the cache memory, a block including a plurality of data storage sectors; and
when the current maximum node weight is less than the block threshold, invalidating all data in the block of the cache memory by making the data inaccessible.

15. The apparatus of claim 5, further comprising
the cache memory;
the controller; and
an interface to receive data access commands from a host, the interface allowing the apparatus to be removed from the host.

16. A computer-readable storage medium storing instructions that cause a processor to perform a method comprising:
- receiving a data access command at a data storage device including a cache memory;
- setting a node weight representing a value of a cache hit potential for selected data associated with the data access command;
- storing a first access counter value for the selected data representing a number of times data has been stored to the cache memory when the selected data was accessed;
- on a subsequent data access to the selected data,
  - increasing the node weight based on the subsequent data access;
  - decreasing the node weight based on a number of times new data has been stored to the cache memory since the first access counter value was stored; and
- removing the selected data from the cache memory or maintaining the selected data in the cache memory based on the node weight and the first access counter value.

17. The computer-readable storage medium of claim 16, the method further comprising:
- when the data access command is a read command, setting the node weight includes:
  - adjusting an existing node weight based on a difference between a current access counter value and the first access counter value representing a previous time the data was accessed;
- when the data access command is a write command, setting the node weight includes:
  - setting the node weight to a default value;
  - incrementing the current access counter value.

18. The computer-readable storage medium of claim 16, the method further comprising:
- performing a cache flush routine on a target block of the cache memory, the target block including a plurality of storage sectors, the cache flush including:
  - designating the target block for erasure if a highest node value of all data in the target block is lower than a first threshold;
  - when the highest node value is greater than the first threshold,
    - calculating a current node weight for each data in the target block by adjusting an existing node weight based on a period since each data was last accessed;
    - determining whether to maintain each data in the cache memory based on whether the corresponding current node weight exceeds a second threshold.

* * * * *